(12) United States Patent
Reuschel et al.

(10) Patent No.: US 10,059,231 B2
(45) Date of Patent: Aug. 28, 2018

(54) VEHICLE SEAT

(71) Applicant: Audi AG, Ingolstadt (DE)

(72) Inventors: Jens Dietmar Reuschel, Ingolstadt (DE); Vanessa Diedrichs, Karlsruhe (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/512,195

(22) PCT Filed: Aug. 5, 2015

(86) PCT No.: PCT/EP2015/001615
§ 371 (c)(1),
(2) Date: Mar. 17, 2017

(87) PCT Pub. No.: WO2016/041612
PCT Pub. Date: Mar. 24, 2016

(65) Prior Publication Data
US 2017/0267126 A1    Sep. 21, 2017

(30) Foreign Application Priority Data
Sep. 20, 2014 (DE) .......................... 10 2014 014 138

(51) Int. Cl.
*B60N 2/07* (2006.01)
*B60N 2/06* (2006.01)

(52) U.S. Cl.
CPC ........... *B60N 2/0742* (2013.01); *B60N 2/074* (2013.01); *B60N 2/0745* (2013.01); *B60N 2/06* (2013.01); *B60N 2/07* (2013.01)

(58) Field of Classification Search
USPC ..... 248/425; 296/65.01, 65.06, 65.11, 65.13, 296/65.14; 297/344.21, 344.22
See application file for complete search history.

(56) References Cited

U.S. PATENT DOCUMENTS

| 7,334,829 B2 * | 2/2008 | Fukui ................... B60N 2/0228 |
| | | 296/65.11 |
| 8,079,641 B2 * | 12/2011 | Lung ........................ B60N 2/14 |
| | | 297/344.24 |
| 8,836,494 B2 | 9/2014 | Reuschel et al. |
| 9,423,094 B2 | 8/2016 | Reuschel et al. |
| 9,849,045 B2 * | 12/2017 | Bourgraf .............. A61G 3/0218 |
| 2011/0012411 A1 * | 1/2011 | Ma ........................... B60N 2/14 |
| | | 297/344.22 |
| 2011/0260482 A1 | 10/2011 | Bourgraf |

(Continued)

FOREIGN PATENT DOCUMENTS

DE    41 04 442 C2    10/1991
DE    10252204 B3    2/2004
(Continued)

OTHER PUBLICATIONS

International Search Report issued by the European Patent Office in International Application PCT/EP2015/001615.

*Primary Examiner* — Alfred J Wujciak
(74) *Attorney, Agent, or Firm* — Henry M Feiereisen LLC

(57) ABSTRACT

A vehicle seat, includes a guide describing a trajectory, said vehicle seat being movable on the guide along the trajectory so that the vehicle seat is moved away from a vehicle center, and a front side of the vehicle seat is rotated about a vertical axis of the vehicle seat toward the vehicle center.

10 Claims, 2 Drawing Sheets

(56) References Cited

U.S. PATENT DOCUMENTS

| 2012/0061548 | A1 | 3/2012 | Moriyama |
| 2013/0193732 | A1 | 8/2013 | Brand |
| 2014/0002254 | A1 | 1/2014 | Reuschel et al. |
| 2014/0321136 | A1 | 10/2014 | Reuschel et al. |

FOREIGN PATENT DOCUMENTS

| EP | 1747935 A2 | 1/2007 |
| FR | 2759648 A1 | 8/1998 |
| GB | 647 459 A | 12/1950 |

\* cited by examiner

VEHICLE SEAT

CROSS-REFERENCES TO RELATED APPLICATIONS

This application is the U.S. National Stage of International Application No. PCT/EP2015/001615, filed Aug. 5, 2015, which designated the United States and has been published as International Publication No. WO 2016/041612 and which claims the priority of German Patent Application, Serial No. 10 2014 014 138.1, filed Sep. 20, 2014, pursuant to 35 U.S.C. 119(a)-(d).

BACKGROUND OF THE INVENTION

The invention relates to a vehicle seat, including a guide, which describes a trajectory along which the seat is movable.

In the future semiautonomous or strongly assisted driving will increasingly become a focus of attention. Hereby the driver is at least partially relieved of the primary driving task due to the fact that the vehicle itself at least partially takes over the longitudinal and transverse guidance or assists the driver regarding a number of driving tasks. The greater the scope or degree of the auto-piloted driving, the less the driver is involved in the actual driving operation. This allows the driver to turn his attention to other activities, for example increased communication with the co-driver or passengers in the rear and makes it possible to perform office tasks during the drive such as reading and writing emails and the like. In addition entertainment programs can be perceived much more intensely and with more concentration because the degree to which the driver has to attend to the driving task is significantly reduced.

Because the steering wheel is positioned directly in front of the driver there may only be limited space for parallel working, such as using a laptop or other mobile device. Also communication with the co-driver or passengers in the rear is complicated due to the orientation of the driver seat because the driver has to turn the seat relatively far when intending to face the co-driver or the passengers in the rear, which is not or not fully possible due to the seat geometry which is optimized for the driving task.

Known are seat adjustments which help improving the comfort of the passengers of the vehicle by lowering seat flanks, lifting the seat surface, turning the entire seat or laterally shifting the seat. In todays passenger car-concepts turning of the vehicle seat toward the center of the vehicle is not or only minimally possible. A face-to-face communication between passengers is therefore not possible.

SUMMARY OF THE INVENTION

The invention is therefore based on the object to disclose a driver seat, which has an improved seat orientation in this regard.

For solving this problem it is provided in a vehicle seat of the aforementioned type that the guide is constructed so that the vehicle seat is movable along the guide by a movement away from the vehicle center and can be turned with its front side about a vertical axis in the direction of the vehicle center.

In the vehicle seat according to the invention it is thus for example possible during auto-piloted driving to move the vehicle seat along the guide so that the vehicle seat is displaced from the vehicle center outwards and along the trajectory described by the guide, wherein the vehicle seat is turned about its vertical axis with its front side in the direction of the vehicle center.

In addition to the movement components along the vehicle longitudinal axis and transverse axis the trajectory, which the guide describes also has a component along the vertical axis of the motor vehicle or the vehicle seat. The generally arbitrary configuration of the guide and thus the trajectory enables a repositioning of the driver seat so that communication between passengers can be improved. As a result of the movement of the vehicle seat from the center outwards and the rotation about its vertical axis in the direction of the vehicle center a position is achieved in which the passenger can assume a seat position which is oriented toward the vehicle center and thus faces the co-driver.

For this purpose the guide has a rail, in particular a pair of rails. The vehicle seat is for example movable along the rail via sliding bodies, carriages or rollers or the like, which enables movement of the vehicle seat relative to the rail.

A preferred embodiment of the invention can be that the vehicle seat has a holding device by which the seat can be caused to assume a releasable fixed state on the guide, preferably by clamping. The fixing can for example be accomplished by bodies with which the vehicle seat is moved along the guide or by separate elements. As an alternative the vehicle seat can be force fittingly or form fittingly fixed in a different manner, for example by a bolt that engages in a recess of the rail.

A preferred embodiment of the vehicle seat according to the invention can be that the holding device is configured to either cause the vehicle seat to assume the fixed position either stepless or at defined positions. This makes it possible that the vehicle seat can be fixed in any desired position that is perceived as the most comfortable for the passengers of the motor vehicle. It is also possible that besides end points of the guide the vehicle seat can also assume further positions. These positions can for example be stored in a control device of the vehicle seat or the motor vehicle and can be assumed as needed, preferably automatically. This seat movement can be triggered by activating the autopilot system.

Preferably the holding device has a remote unlocking which is configured to release the driver seat in the fixed position. This remote unlocking can on one hand be controlled electrically or electronically in order to enable an electrical or automatic fixing and release of the vehicle seat. As an alternative the remote unlocking can also be configured for mechanical operation by a passenger in order to release the vehicle seat in the fixed position, for example by actuating a lever or a rope pull and after the seat is in the desired position to cause the vehicle seat to assume the fixed position by releasing the lever. For this purpose the remote unlocking releases the force-fitting or form-fitting fastening and/or clamping of the vehicle seat on the guide or the rail. This enables a purely mechanical adjustment of the vehicle seat along the guide and tilting of the seat surface or seat field.

A particularly preferred embodiment of the vehicle seat according to the invention can provide that the vehicle seat has a drive for movement of the vehicle seat along the guide. This has the advantage that the passengers do not have to manually move the vehicle seat but the seat can on one hand be steplessly moved into the desired position by actuating a switch or it can move fully automatically into the desired position for example when activating the autopilot.

The vehicle seat according to the invention can also have an actuator, which is configured to tilt at least a portion of the seat surface of the vehicle seat about at least one axis. Preferably, by means of the actuator the seat surface or a part of the seat surface can be tilted about the longitudinal axis and/or the transverse axis of the vehicle seat, which in the initial sate can correspond to the longitudinal axis or the transverse axis of the motor vehicle. In addition to the adjustment of the vehicle seat along the trajectory this makes it possible to adjust a seat tilt. For this purpose it can be provided that a small part of the entire seat surface, i.e., a limited seat field, is tilted while the remaining portion of the seat surface remains in the starting position. The tilting can be coupled to the movement of the vehicle seat so that a tilt angle of the seat surface or the limited seat field increases with respect to the vehicle longitudinal axis or the vehicle transverse axis with increasing distance of the vehicle seat to the vehicle center or decreases with decreasing distance to the vehicle center.

For this purpose the vehicle seat according to the invention can have at least one surface element, which can be adjusted by the actuator and is configured to tilt the seat surface or the lifted seat field along at least one axis. Such a surface element can be configured as a part of the seat surface whose tilt can be adjusted by means of the actuator along at least one axis. The actuator can further be configured to electrically or pneumatically adjust the at least one portion of the seat surface and/or the surface element. It is further provided that the actuator enables a mechanical adjustment, i.e., for example by actuation of a pivoted lever by a passenger. It is also possible that the surface element has a characteristic shape, which corresponds to the desired seat surface shape and is moved against the latter from below in order to correspondingly shape the seat surface.

A preferred embodiment of the vehicle seat according to the invention can provide that its guide has a longitudinal adjustment, which is configured to adjust the vehicle seat along the longitudinal axis of the motor vehicle. This has the advantage that, as is common, the vehicle seat is adjustable along the vehicle longitudinal axis in order to allow passengers to adjust the position of the vehicle seat along the vehicle longitudinal axis as they are used to. The adjustment of the vehicle seat along the guide is hereby decoupled from the longitudinal adjustment. The vehicle seat according to the invention can thus be adjusted along the guide at each position on the longitudinal adjustment.

The invention also relates to a motor vehicle including at least one, preferably two, adjacently arranged vehicle seats according to the invention. In the motor vehicle of course also one or multiple corresponding operating elements are provided, which enable the respective seat adjustment. In an active drive with assigned seat position it is conceivable to trigger the changed seat position by actuation of an operating element for a (semi) autonomous drive. When the button is actuated so as to transition to an active driving operation again the seat position is reversibly reset.

BRIEF DESCRIPTION OF THE DRAWING

In the following the invention is explained in more detail by way of an exemplary embodiment with reference to the drawings. The drawings are schematic representations and show in.

DETAILED DESCRIPTION OF THE PREFERRED EMBODIMENTS

Figure 1:
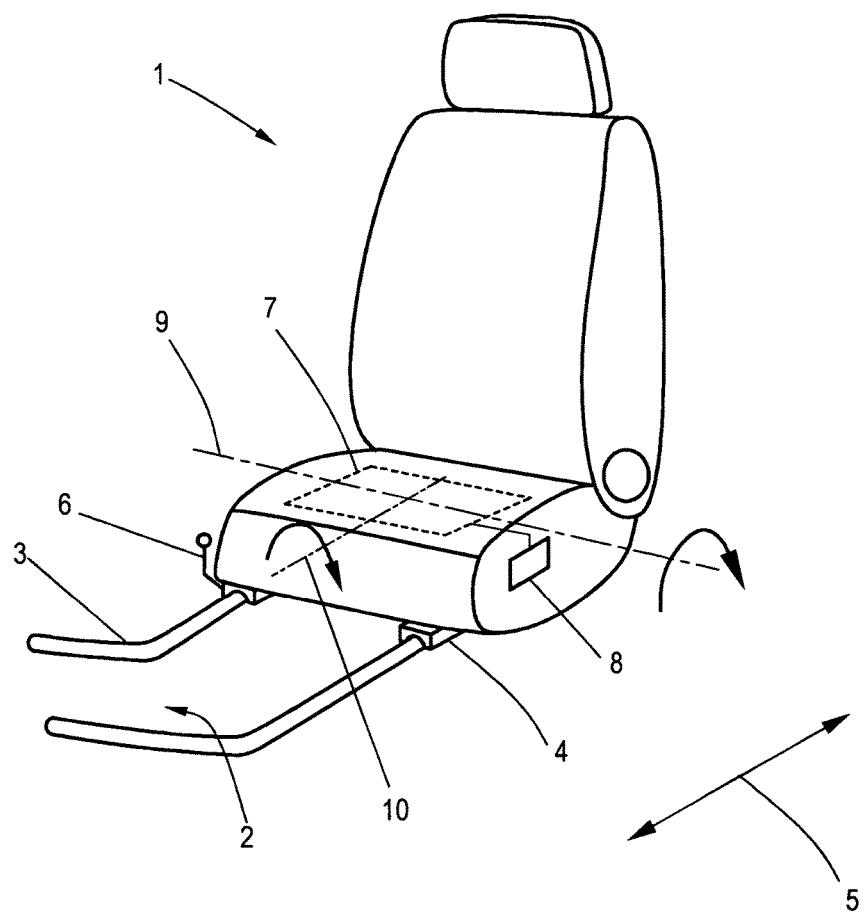
FIG. 1 a perspective view of a vehicle seat according to the invention.
Figure 2:
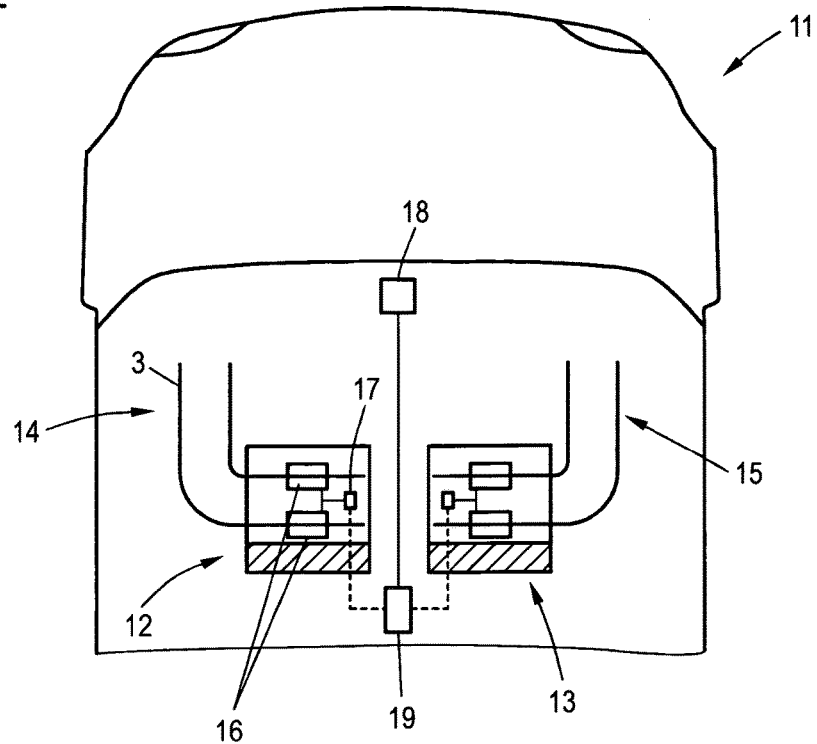
FIG. 2 the vehicle seat of FIG. 1 in a top view in a motor vehicle according to the invention in the staring position.
Figure 3:
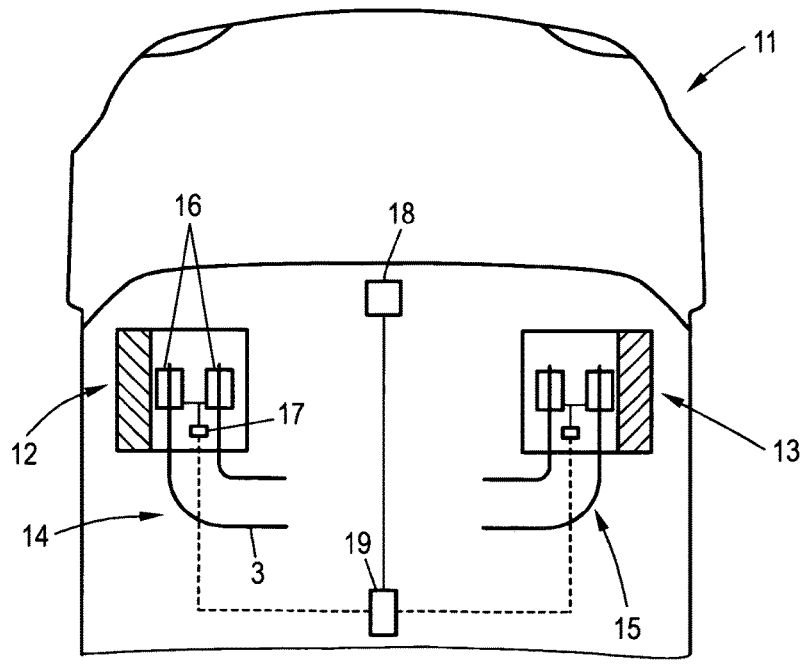
FIG. 3 the motor vehicle of FIG. 2 with adjusted position of the vehicle seat.

FIG. 1 shows a vehicle seat 1 including a guide 2, which describes a trajectory along which the vehicle seat is moveable. The guide 2 includes a pair of substantially parallel rails 2, on which the vehicle seat 1 is movable with sliding bodies 4. As shown in FIGS. 1-3, the pair of substantially parallel rails 2 curve in the form of an L-shape so as to extend substantially parallel to the longitudinal axis of the motor vehicle and substantially perpendicular to the longitudinal axis of the motor vehicle. Integrated into the sliding bodies 4 is a not further shown holding device. The holding device is configured to hold the vehicle seat 1 at each position of the rails 3 in an arrested, fixed state. For this purpose the holding device clamps the sliding bodies 4 on the rails 3, thereby fixing vehicle seat 1.

This fastening of the vehicle seat 1 accomplished by the clamping by the holding device can be released by a not shown passenger. By actuation of a lever of the remote unlocking 6 the clamping of the sliding bodies 4 on the rails 3 caused by the holding device is released, which renders the vehicle seat 1 movable on the rails 3 along the guide 2. When releasing the spring loaded remote unlocking 6 the holding device again causes the clamping of the sliding bodies 4 on the rails 3. Thus the vehicle seat 1 is fastened again. It is also possible to actuate the holding device electrically, pneumatically or hydraulically by means of a control device. In addition the vehicle seat 1 is arranged on a longitudinal adjustment, which permits an adjustment of the vehicle seat 1 along the vehicle longitudinal axis. This is indicated by the double arrow 5.

FIG. 1 also shows that the vehicle seat 1 has a surface element 7, which corresponds to a part of the seat surface of the vehicle seat 1. The surface element 7 can be tilted by means of an actuator 8 about axes 9 and 10, which correspond to the longitudinal axis and the transverse axis of the of the vehicle seat 1. The actuator 8 is configured as an electrical actuator, however, it can also be configured as a pneumatic or mechanical actuator. The sliding bodies 4 are arranged parallel to each other and parallel to the longitudinal axis 10 of the vehicle seat. Depending on the configuration of the guide 2 an arrangement parallel to the transverse axis 9 of the vehicle seat 1 is also possible.

Such an arrangement of the sliding bodies 4 is shown in FIG. 2, which shows a top view onto a motor vehicle 11. The motor vehicle 11 has vehicle seats 12 and 13, wherein vehicle seat 12 is configured as a driver seat and vehicle seat 13 is configured as a co-driver seat. The vehicle seats 12 and 13 are similar to vehicle seat 1 except for the arrangement of the guides 14 and 15 and the sliding bodies 16. These are oriented parallel to the axis 9. In addition, the vehicle seats 12 and 13 also each have a drive 17, which is configured to move the vehicle seat 12, 13 along the guide 14, 15. In the view shown in FIG. 2 the vehicle seats 12, 13 are in the starting position, which is present when the motor vehicle 11 is operated in a state in which it is actively steered by a driver. When an at least semi-autonomous driving is activated a signal can be transmitted to a control device 19 by means of an actuating element 18, which control device 19 controls the drives 17 of the vehicle seats 12, 13, so that these are moved into a position that is more comfortable for a semi-autonomous driving.

This position is shown in FIG. 3. As a result of the movement of the vehicle seat 12, 13 along the guides 14, 15 the vehicle seats 12, 13 were rotated about their vertical axis so that their front sides face toward the vehicle center. In addition the vehicle seats 12, 13 were moved from the center outwardly by movement along the guides 14, 15. As a result the passengers obtain more legroom. In the situation depicted in FIG. 3 it is easier for the passengers of the vehicle 11 to work or to engage in conversation. It is also possible, in addition to the respective start and end of the guides 14, 15, to position the vehicle seats 12, 13 at any desired position of the guide. As a result the passengers can select a position that is comfortable for them. Of course it is also possible to configured the guide 14, 15 differently so that a further rotation of the vehicle seats 12, 13 in the direction of the rear passengers and a change of the seat height by a guide 2, 14, 15 with a component in the direction of the vertical axis of the vehicle seat 12, 13 or the motor vehicle 11 is possible, which enables further improving communication in the motor vehicle 11 in a fully automated driving operation.

In the situation depicted in FIG. 3 It is also possible to tilt the seat surface by means of the actuators 8 and surface elements 7 along the axes 9 and 10 of the vehicle seats 12, 13. This further improves assuming of a comfortable position for the vehicle passengers.

The invention claimed is:

1. A vehicle seat, comprising:
   the vehicle seat,
   a guide describing a trajectory, said vehicle seat being movable on the guide along the trajectory so that the vehicle seat is moved away from a vehicle center and a front side of the vehicle seat is rotated about a vertical axis of the vehicle seat toward the vehicle center, wherein the guide comprises a pair of substantially parallel rails and a longitudinal adjustment configured to adjust the vehicle seat along a longitudinal axis of a motor vehicle, wherein the pair of substantially parallel rails curve in the form of an L-shape so as to extend substantially parallel to the longitudinal axis of the motor vehicle and substantially perpendicular to the longitudinal axis of the motor vehicle,
   wherein the vehicle seat further comprising a holding device configured for causing a fixed state of the vehicle seat on the guide and the holding device is configured to fix the vehicle seat on the guide by a releasable clamping.

2. The vehicle seat of claim 1, wherein the guide has a component which extends along the vertical axis of the vehicle seat.

3. The vehicle seat of claim 1, wherein the holding device is configured to fix the vehicle seat on the guide stepless or at discrete positions along the guide.

4. The vehicle seat of claim 1, wherein the holding device comprises a remote unlocking configured to release the fixed state of the vehicle seat.

5. The vehicle seat of claim 1, further comprising a drive for moving the vehicle seat along the guide.

6. The vehicle seat of claim 1, further comprising an actuator configured to tilt at least a portion of a seat surface of the vehicle seat about at least one axis.

7. The vehicle seat of claim 6, wherein the portion of a seat surface comprises at least one surface element, said at least one surface element being adjustable by the actuator and configured to tilt the portion of the seat surface along the at least one axis.

8. The vehicle seat of claim 7, wherein a tilting of the seat surface or the at least a portion of the seat surface is coupled to a movement of the vehicle seat so that a tilt angle of the seat surface or the portion of the seat surface increases relative to at least one of the axes with increasing distance of the vehicle seat to the vehicle center and decreases with decreasing distance of the vehicle seat to the vehicle center.

9. The vehicle seat of claim 6, wherein the actuator is configured to adjust at least one of the portion of the seat surface and the surface element electrically, mechanically or pneumatically.

10. A motor vehicle comprising:
    a vehicle seat comprising a guide, said guide describing a trajectory, said vehicle seat being movable on the guide along the trajectory so that the vehicle seat is moved away from a vehicle center and a front side of the vehicle seat is rotated about a vertical axis of the vehicle seat toward the vehicle center, wherein the guide comprises a pair of substantially parallel rails and a longitudinal adjustment configured to adjust the vehicle seat along a longitudinal axis of a motor vehicle, wherein the pair of substantially parallel rails curve in the form of an L-shape so as to extend substantially parallel to the longitudinal axis of the motor vehicle and substantially perpendicular to the longitudinal axis of the motor vehicle,
    wherein the vehicle seat further comprising a holding device configured for causing a fixed state of the vehicle seat on the guide and the holding device is configured to fix the vehicle seat on the guide by a releasable clamping.

* * * * *